(12) United States Patent
Shabi et al.

(10) Patent No.: US 11,449,480 B2
(45) Date of Patent: *Sep. 20, 2022

(54) SIMILARITY HASH FOR BINARY DATA PAGES

(71) Applicant: EMC IP Holding Company LLC, Hopkinton, MA (US)

(72) Inventors: Uri Shabi, Tel Mond (IL); Alon Titelman, Herzliya (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

This patent is subject to a terminal disclaimer.

(21) Appl. No.: 16/669,886

(22) Filed: Oct. 31, 2019

(65) Prior Publication Data

US 2021/0133166 A1    May 6, 2021

(51) Int. Cl.
  *G06F 16/00* (2019.01)
  *G06F 16/215* (2019.01)
  *G06K 9/62* (2022.01)
  *G06F 16/22* (2019.01)

(52) U.S. Cl.
  CPC ........ *G06F 16/215* (2019.01); *G06F 16/2255* (2019.01); *G06K 9/6215* (2013.01)

(58) Field of Classification Search
  None
  See application file for complete search history.

(56) References Cited

U.S. PATENT DOCUMENTS

2019/0114539 A1* 4/2019 Chistyakov ............ G06N 5/003
2020/0073959 A1* 3/2020 Tian ...................... G06F 21/561

OTHER PUBLICATIONS

Moses S. Charikar, "Similarity Estimation Techniques from Rounding Algorithms," Princeton University, May 19-21, 2002.
http://matpalm.com/resemblance/simhash/, date of May 2009.
Uri Shabi, et al., "Techniques for Efficiently Determining Similarity Hashes," U.S. Appl. No. 16/669,860, filed Oct. 31, 2019.

* cited by examiner

*Primary Examiner* — Bai D Vu
(74) *Attorney, Agent, or Firm* — Muirhead and Saturnelli, LLC

(57) ABSTRACT

Techniques for data processing may include: receiving a page P having a binary representation; determining a plurality of features for the page P; determining a plurality of feature hashes for the plurality of features, wherein each of the plurality of feature hashes corresponds to a different one of the plurality of features, wherein said each feature hash is determined using a hash function and in accordance with said different one of the plurality of features and an index associated with said different one of the plurality of features; and determining, in accordance with the plurality of feature hashes for the plurality of features, a similarity hash for the page P.

18 Claims, 10 Drawing Sheets

500

502 — Determine the size of each page (e.g., 4096 bytes) and s denoting the alignment tolerance and requirement. Depending on how features are formed subsequently, k may also be determined where k denotes the number of bytes in each feature.

504 — Receive page P of data having a binary representation that is used to form the features for the page. Depending on the embodiment, one or more features may be omitted or ignored. For example, in at least one embodiment, an optimization may be performed to ignore or omit features having a value of 0.

506 — Determine feature hashes using a hash function H. A feature hash hj may be determined for feature fj using H such that hj=H(fj, j mod s), wherein j denotes the unique index associated with the feature j.

508 — The bitwise majority is determined for each bit position "i" in the feature hashes. Bit position i of S(P), the similarity hash for page P, is the bitwise majority of the bits in the bit position i of the feature hashes

SIMILARITY HASH FOR BINARY DATA PAGES

BACKGROUND

Technical Field

This application generally relates to data storage and, more particularly, determining a similarity measurement that may be used, for example, in connection with data reduction techniques.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing data. A page P is received having a binary representation. A plurality of features for the page P are determined. A plurality of feature hashes are determined for the plurality of features. Each of the plurality of feature hashes corresponds to a different one of the plurality of features. Each feature hash is determined using a hash function and in accordance with the different one of the plurality of features and an index associated with the different one of the plurality of features. A similarity hash for the page P is determined in accordance with the plurality of feature hashes for the plurality of features.

In at least one embodiment, processing may include performing data reduction processing using the similarity has for the page P. The data reduction processing may include compression processing. The data reduction processing may include deduplication processing. Each of the plurality of feature hashes may include N bits and wherein the similarity hash for the page P may include N bits. Determining the similarity hash for the page P may include determining a bitwise majority for each of the N bit positions in the similarity hash for the page P in accordance with bit values included in said each bit position in the plurality of feature hashes.

In at least one embodiment, each feature hash may be determined in accordance with a salt value including the index. The salt value may be a remainder of the index divided by a first value. The first value may denote an alignment requirement for the page P. The first value may denote an alignment tolerance. For example, 2 pages that are misaligned by an integer multiple of the first value may be considered similar using the techniques herein. The first value may be an integer denoting a number of bytes.

In at least one embodiment, each of the plurality of features for the page P may include same number of bits of the page P.

In at least one embodiment, each of the plurality of features for the page P may be an output of a function that takes, as an input, a portion of bits of the page P.

In at least one embodiment, determining the plurality of features for the page P may include partitioning the page P into a plurality of chunks, wherein each chunk includes a plurality of sequential consecutive bits from the page P.

In at least one embodiment, each of the plurality of features may have a bit representation of an integer numeric value that is non-zero.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
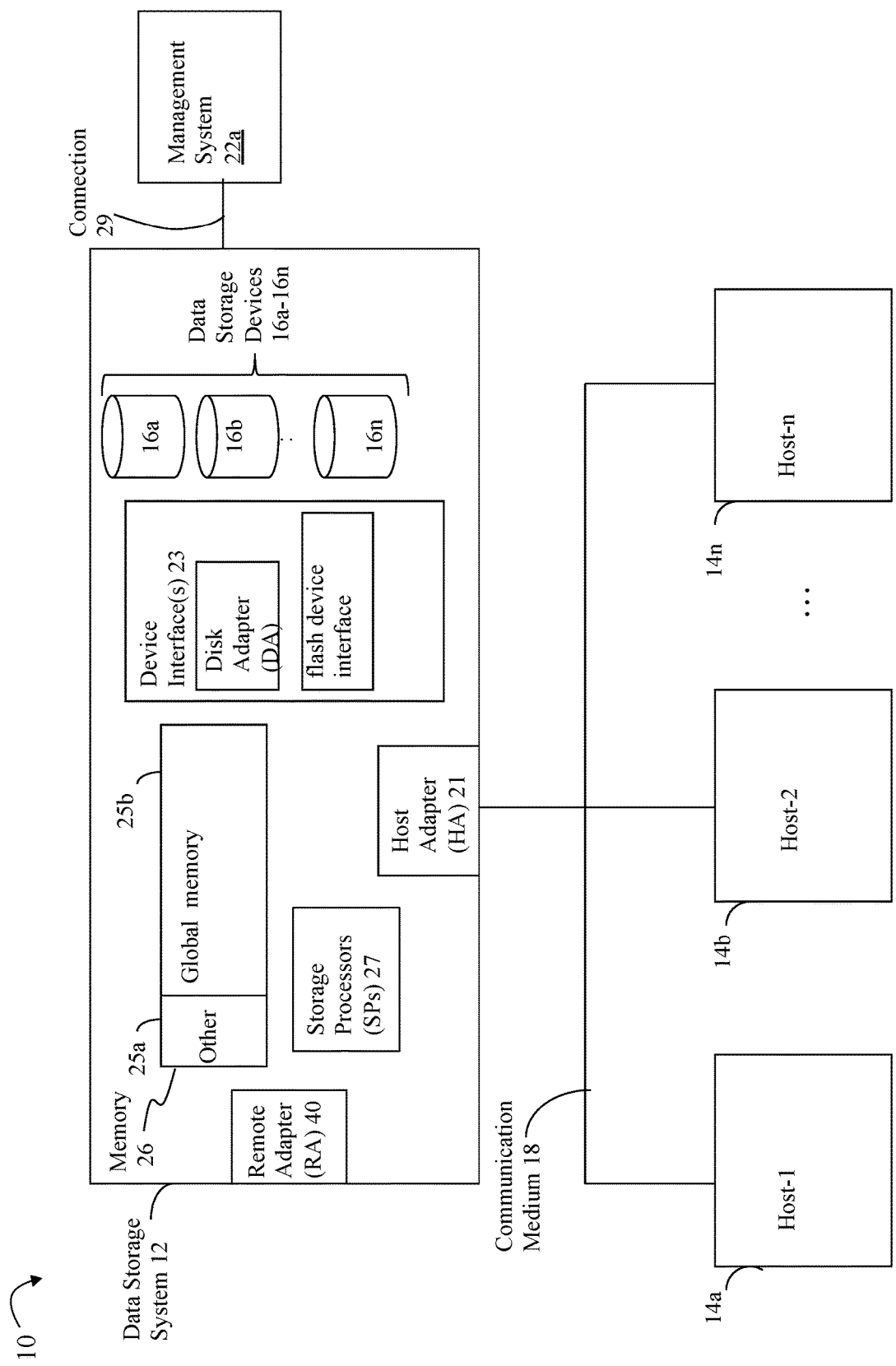
FIGS. 1 and 2B are examples of components that may be included in a system in accordance with techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 cryptographic hashing algorithm known in the art. Data deduplication generally refers to removing redundant or duplicate data portions. Data deduplication techniques may include looking for duplicate data blocks whereby only a single instance of the data block is retained (stored on physical storage) and where pointers or references may be used in connection with duplicate or redundant copies (which reference or identify the single stored instance of the data block).

Figure 2A:
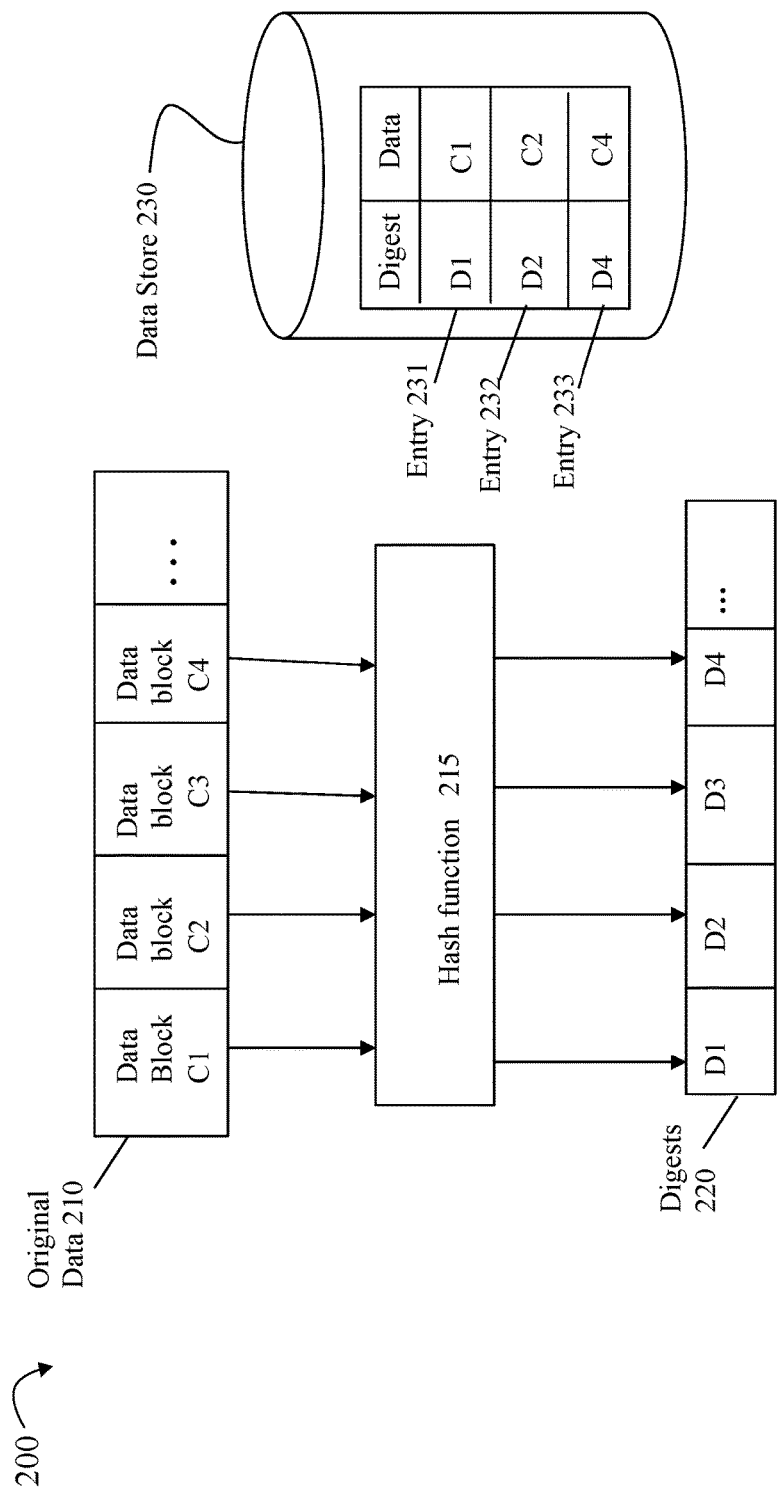
FIG. 2A is an example illustrating data deduplication as may be performed in an embodiment in accordance with techniques herein.

Referring to the FIG. 2A, shown is an example 200 illustrating processing that may be performed in connection with data deduplication processing in an embodiment in accordance with techniques herein. The element 210 may denote the original data being written or stored on back-end non-volatile storage. The original data may be partitioned into multiple data blocks C1, C2, C3, C4 and the like. In at least one embodiment and for purposes of illustration, the data blocks may all be the same size where the size may vary with embodiment. As a variation depending on the data deduplication technique utilized, the blocks of 210 may be of varying or different sizes. Each block is provided as an input to hash function 215. As noted above, in at least one embodiment, the hash function 215 may be the SHA-256 hashing algorithm, or more generally, any suitable cryptographic, or non-cryptographic hashing function known in the art. For each block of 210, the hash function 215 may perform processing and generate, as an output, a hash value or digest. The element 220 includes digests D1, D2, D3, D4, and the like, where a corresponding different one of the digests DN is generated for one of the blocks CN (where "N" is an integer denoting the block and associated digest generated for that block). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different blocks. The strength of the hash function 215 may be measured by the unlikelihood of a collision occurring where two different input blocks of data produce the same digest. The strength increases with the bit length of the hash value or digest. Thus, if two blocks, such as C1 and C3, have the same digests whereby D1=D3, then blocks C1 and C3 match (e.g., are identical matching data blocks). If two blocks, such as C1 and C4, have different digests whereby D1 does not equal D4, then blocks C1 and C4 do not match (e.g., are different or non-matching data blocks). In cases where two matching or identical blocks have the same digest, only a single copy of the data block is stored on backend non-volatile physical storage of the data storage system. The single stored instance of the data block may be referenced using a pointer, handle, the digest of the block, and the like.

The element 230 of the FIG. 2A may denote the data store, such as a data base (DB) used to store data blocks. In this example, as noted above, assume blocks C1 and C3 are the same with remaining blocks C2 and C4 being unique. In at least one embodiment, element 230 may be organized and managed using a data structure, such as a hash table. In at least one embodiment, computed digests, or portions thereof, may be used as an index into the hash table where the single unique instances of data blocks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the block of data may be mapped by hash function 215, and thus by the block's digest, to a particular entry in the table at which the block of data is stored. To further illustrate, the hash function 215 may be used to generate a hash value or digest for a particular data block. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data block, such as C1, its digest may be mapped to a particular hash table entry 231 whereby if the table entry is null/empty, or otherwise does not already include a data block matching C1, then C1 is stored in the table entry along with its associated digest D1 (this is the first time block C1 is recorded in the data store 230). Otherwise, if there is already an existing entry in the table including a data block matching C1, it indicates that the new data block is a duplicate of an existing block. In this example as noted above, processing is performed for C1, C2, and C4 respectively, where entries 231, 232, and 233 are added since there are no existing matching entries in the hash table. When processing block C3, as noted above, C3 has a digest D3 matching D1 whereby C3 (and thus D3) maps to entry 231 of the hash table already including a matching block C1 (so no additional data block is added to 230 for C3 since C3 is determined as a duplicate of C1). In connection with representing a particular file or other storage entity including multiple duplicate occurrences of a particular block such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data to its original form, the handle or reference into the hash table for block C3 may be used to obtain the actual C3 block of data from 230.

Figure 2B:
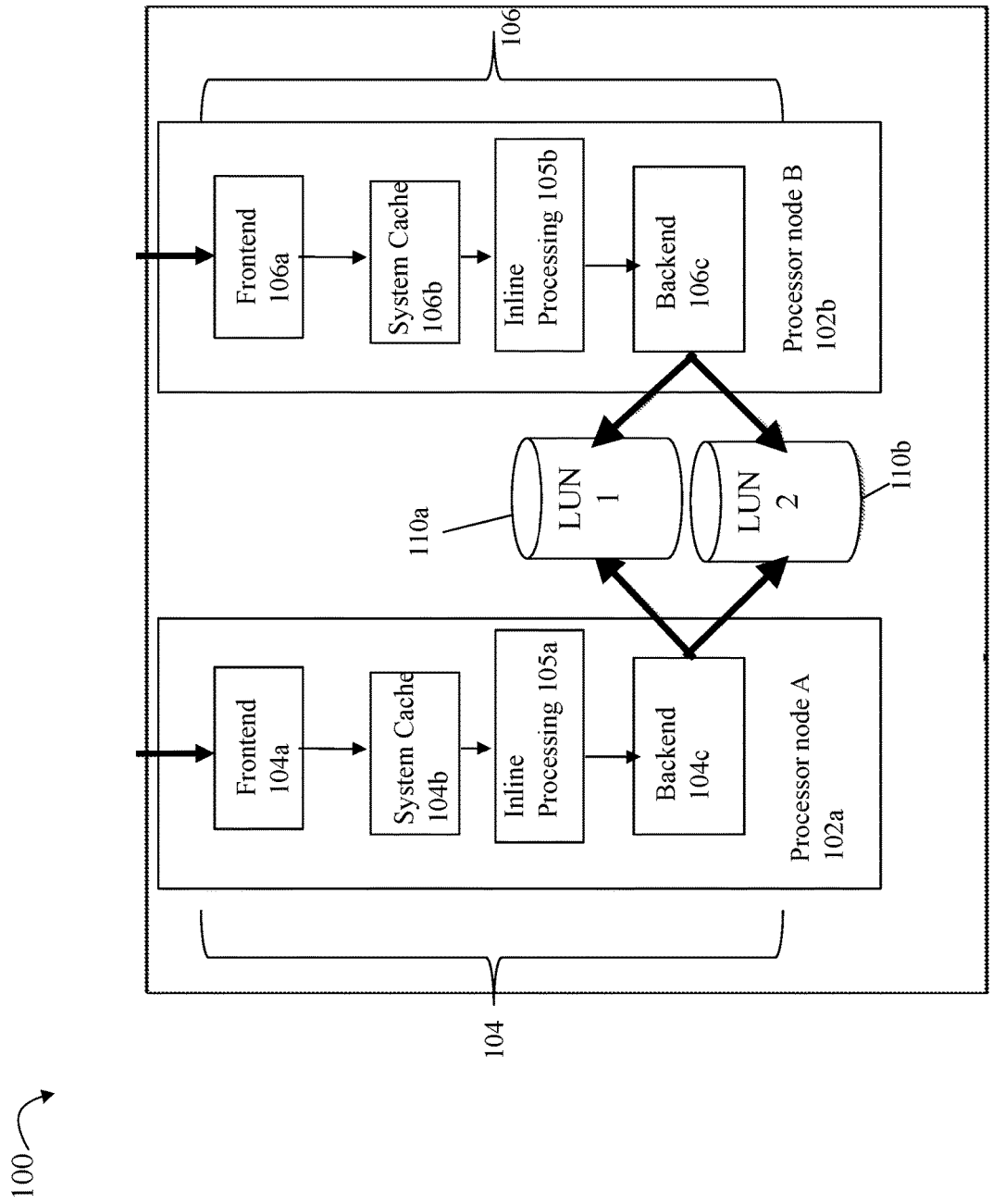

With reference to the FIG. 2B, shown is an example 100 illustrating components that may be included in the data path in at least one existing data storage system in accordance with the techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. The elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component 104a). At various points in time, the WP data stored in the system cache is flushed or written out to the physical storage 110a, 110b. In connection with the inline processing layer 105a, prior to storing the original data on the physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a block) of the original data is a duplicate of an existing data portion already stored on 110a, 110b, that particular portion of the original data is not stored in a compressed form and may rather be stored in its deduplicated form (e.g., there is no need for compression of a block determined to be duplicate of another existing block). If the original data portion is not a duplicate of an existing portion already stored on 110a, 110b, the original data portion may be compressed and stored in its compressed form on 110a, 110b.

In connection with a read operation to read a block of data, a determination is made as to whether the requested read data block is stored in its original form (in system cache 104b or on physical storage 110a, 110b), or whether the requested read data block was previously deduplicated or compressed. If the requested read data block (which is stored in its original decompressed, non-deduplicated form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block was previously deduplicated, the read data block is recreated and stored in the system cache in its original form so that it can be returned to the host. If the requested read data block was previously compressed, the block is first decompressed prior to sending the read data block to the host. If the compressed read data block is already stored in the system cache, the data is uncompressed to a temporary or buffer location, the uncompressed data is sent to the host, and the buffer or temporary location is released. If the compressed read data block is not in the system cache but stored on the physical storage 110a, 110b, the compressed read data block may be read from the physical storage 110a, 110b into the system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In connection with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage.

When the processor performs processing, such as in connection with the inline processing 105a, 105b as noted above, data may be loaded from the main memory and/or other lower cache levels into its CPU cache. In particular, inline compression (ILC) and inline data deduplication (ILD) may be performed as part of the inline processing 105a, 105b. In at least one embodiment, the size of a data block processed by ILC and ILD may be 4096 bytes=4 KB (kilobytes) in size.

Some existing implementations of deduplication use a deduplication data store (dedupe data store or DB) as described in connection with the element 230 of the FIG. 2A having a hash table organized by indices which are randomly distributed so that updates, retrievals, and other data access operations can be costly. The data store may be stored on backend non-volatile storage PDs which can be costly (in terms of time) to access when performing data deduplication processing. To improve performance, some existing implementations may use caching to cache portions of the data store. However, the entire data store is typically not capable of being stored completely in the cache due to the often large size of the data store as compared to the limited size of the cache. Additionally, any cached portion of the data store may not be persistently stored where the cache thus requires repopulation upon reboot of the system.

At least one existing implementation may perform data deduplication at the data block level of granularity, for example, where each entry of the data store 230 is mapped to a single unique data block. As used herein, a target data block or page, target block or page, or dedupe target refers to a single unique instance of a data block or page currently stored in the dedupe data store 230. A candidate data block or page, candidate block or page, or dedupe candidate refers to a data block or page for which deduplication processing is performed with the goal of eliminating duplicate candidate blocks or pages from being stored. A digest may be computed for the candidate data block using a hash function whereby the digest identified the candidate data block with a high level of uniqueness, even though the digest is typically much smaller than the candidate data block itself. Digests thus enable data block matching between the candidate and target data blocks in the dedupe data store 230 to proceed quickly and efficiently. Consistent with discussion above, for each digest in the dedupe data store 230, the data store 230 stores a pointer that leads to a stored version of the respective target data block. To perform deduplication on a particular candidate block, a storage system computes a digest of the candidate block and searches the dedupe data store 230, or a cached version thereof, for an entry that matches the computed digest. If a match is found, the storage system may then compare the actual content of the target block with the content of the candidate block to ensure the target and candidate data blocks having matching content. If the target and candidate data blocks having matching content, processing may arrange metadata of the candidate block to point to the target data block that the dedupe data store 230 has associated with the matching digest. In this manner, a duplicate copy of the data block is avoided.

The foregoing where matching candidate and target data pages or blocks are determined may be characterized as a full data block or page deduplication at the data block or page level of granularity. For a candidate data block or page to be deduplicated using full block or page deduplication, the entire candidate block or page (e.g., all portions or sub-blocks of the candidate data block or page) must exactly match an existing target block or page. Furthermore, the position or location of each matching sub-block of the candidate block must correspond to the same position or location of the matching sub-block of the target block. For example, if the target block and candidate block each include 8 sub-blocks, sub-block "I" of the target block matches sub-block "I" of the candidate block, for all I=0 through 7, inclusively (e.g., with zero-based sub-block notation).

Unfortunately, deduplication schemes using only full block or page deduplication fail to detect redundant data when blocks are similar but not identical. For example, a data storage system may store two target data blocks or pages which only differ by only one sub-block or even a single bit or byte. Thus, using only full block or page deduplication, opportunities for deduplication of similar data blocks or pages, but not full data block or page matches, are missed.

As mentioned above, another data reduction technique that may be used is data compression. In connection with data compression, the amount of data reduction achieved depends on, and varies with, the particular data blocks or pages that may be compressed together as a single compressible unit. In particular, the amount of data reduction achieved in connection with compression varies with the amount of redundant data within the single compression unit.

To further reduce the consumed storage capacity, following paragraphs describe additional techniques that may be used in an embodiment. The techniques in following paragraphs may be used to identify data pages or blocks that are similar but are not identified as complete or full matches. Generally, two pages or blocks that are similar means that both pages or blocks include redundant data present in both pages, and that both pages may also include unique data not common or redundant to both pages or blocks.

In at least one embodiment, a similarity measurement, such as a similarity hash computed using a similarity hash function (simhash) S described in more detail elsewhere herein, may be computed for each page or block. In at least one embodiment, if two pages or blocks have similarity measurements that are within a specified threshold distance or difference of one another, the two pages or blocks may be identified as similar to one another (e.g. having similar content or at least some content common to both pages or blocks). More generally, in at least one embodiment two or more pages or blocks may be identified as similar to one another if all such pages or blocks have similarity measurements that fall within a specified threshold window or distance of one another. For example, a threshold window or distance denoting a maximum allowable distance may be defined and all pages or blocks having associated similarity measurements within the threshold window or maximum allowable distance may be identified as similar to one another. Thus, an embodiment in accordance with the techniques herein may compute a similarity hash for each of the pages or blocks and use such similarity hash values to determine whether the pages or blocks are similar. Comparison of such similarity hash values provides for quicker more efficient comparison than, for example, comparing the data content of the pages or blocks themselves to determine whether the pages or blocks are similar in terms of content.

The similarity hash function S generates similar hash values for similar data pages or blocks. The similarity hash function may be contrasted with other hash functions, such as the hash function 215 described above. For example, the hash function 215 as described above may be a cryptographic hash function that generates a hash value for a given input, where the hash values generated are randomly and uniformly distributed and uncorrelated to the particular inputs. In contrast, the similarity hash function S described in more detail elsewhere herein generates hash values that are correlated to or related to the content of the input to S. Thus, the more similar the content of the data pages or blocks, the closer the similarity measurements or hash values generated by S for such data pages or blocks.

Generally, identifying similar pages or blocks such as using the similarity hash values for such pages or blocks has many suitable applications that may vary with embodiment. Also described in following paragraphs are some non-limiting uses of the techniques described herein.

In at least one embodiment, the techniques herein may be used to identify similar data blocks or pages that may be compressed together as a single compressible unit. In such an embodiment, compression processing may be performed on similar pages or blocks expected to have some matching or duplicate sub blocks among the pages. The more similar pages are to one another, the higher may be the expected compression ratio, and the greater the expected amount of data reduction achieved.

In at least one embodiment, the techniques herein may be used to identify similar data blocks or pages in connection with identifying partial data deduplication candidates. For example, a target block or page may be stored in the deduplication database. The target block or page may denote a unique instance of data content stored in the deduplication database. A candidate block or page may be received and processing may be performed to identify which one or more target blocks are similar to the candidate block. If at least one target block is similar to the candidate block, the candidate block may be partially deduplicated with respect to the target block. For example, byte level or sub-block level comparison of the content of the target and candidate may be performed to determine the differences in data content between the target and candidate as well as the location of such differences. In at least one embodiment, the candidate block may be stored as a partially deduplicated version of the target block. When storing the candidate block as a partial deduplicated data block, reference may be made to the target block in combination with other metadata and data content identifying the differences between the candidate block and target block. For example, if only the first byte of the candidate block and the target block differ, the recorded or stored differences may identify the first byte location and also store the unique content of the first byte of the candidate. In this manner, the candidate block content may be formed using the content of the target block overwritten by the recorded or stored unique content of the first byte of the candidate block.

The foregoing and other aspects of the techniques herein are described in more detail in following paragraphs.

A data block or page as noted above is a unit of storage and may generally be any suitable size and may vary with embodiment. For example, the size of a data block or page may be 32 KB, 4 KB, 512 bytes, and the like. In at least one embodiment in accordance with the techniques herein described in following paragraphs, the block or page size may be 4 KB or 4096 bytes. Each block or page may be further characterized as including 8 sub-blocks or sectors each of which is 512 bytes in size. In at least one embodiment, each block or page may be aligned on a 512 byte boundary.

A data block or page may be a buffer of data represented or further characterized as an integer having a binary representation. The integer may be a value in the range, inclusively, from 0 to MAX, where MAX is based on the size, such as the number of bytes, of the data block or page. For example, for a page size of 4096 bytes, the page may be represented as an integer between 0 and ($2^{8*4096}-1$) having a binary representation. It is this binary representation of the data block or page that may be used in connection with the techniques herein with the similarity hash function S to determine a similarity measurement or hash value for the data block or page.

An embodiment in accordance with the techniques herein may use a distance function to provide a measurement or degree of similarity between two data blocks. For example, in at least one embodiment, the Hamming distance $D(X,Y) = |\{i \in N: 2^i 61 \, X \oplus Y \neq 0\}|$ between two integers X and Y, and thus two data blocks or pages represented as the two integers X and Y, may defined to be the number of different bits in their binary, bitwise representations. $\oplus$ denotes the logical XOR (exclusive OR) operation that has a value of 1 or true when the two inputs are different, and a value of zero (0) or false otherwise. Thus, the XOR operation results in a 1 for a bit position for inputs (0, 1) and inputs (1, 0). As a simple example, assume that the page or block X has a first binary representation "0000 0011" and the page or block Y has a second binary representation "0000 0001", the Hamming distance $D(X,Y)=1$ indicating that there is 1 bit that is different with respect to the binary representations of X and Y, where X has a corresponding (base 10) integer value of 3, and Y has a corresponding (base 10) integer value of 1. The smaller the Hamming Distance D with respect to the inputs X and Y, the greater the similarity between X and Y and thus the closer X and Y are expected to be in terms of data content.

The similarity measurement or similarity hash (simhash) with respect to a data block or page P may be denoted as S(P). S may denote the similarity hash function, simhash, that is described in more detail elsewhere herein.

In at least one embodiment in accordance with the techniques herein, the Hamming distance D between two data blocks or pages may also be determined with respect to hashes for the two data blocks or pages. The hashes may be generated using a distance preserving hash function such as the similarity hash function simhash S described in more detail elsewhere herein.

Generally, to measure the Hamming distance D between two data blocks, a distance preserving hash function such as simhash S described herein may be used that preserves the distance property between data blocks or pages such that the distance between the similarity hashes of the two blocks or pages will correspond to the distance (e.g., similarity or differences) between the bits of the two blocks or pages. The Hamming distance function D between the data blocks and the hashes of such data blocks preserves the relation between two pairs of data blocks with similar content to each other. For example, assume two blocks X and Y with bit contents b1 and b2 that are to be compared for similarities by measuring the Hamming distance D (b1,b2) between them. The distance preserving hash function, S, denoting simhash, may be used to compute the full page or block hashes that preserves the distance relation between D(b1,b2) and D(S(b1),S(b2)).

Generally, for the Hamming distance D with respect to two pages or data blocks X, Y, the following is true:
1. D (X,Y)>0.
2. D (X,Y)=0 if, and only if X=Y.
3. D (X,Y)=D(y,x)

Furthermore for an additional data block Z,
4. D (X,Y) <D (X,Z)+D (Z,Y)

In connection with the techniques herein where D is determined with respect to data blocks X and Y, Z may be any arbitrary data block in the same data space as the data blocks X and Y.

In a similar manner, using the distance preserving hash function simhash S, the hash values S(X) and S(Y) may be used to determine the Hamming Distance D with respect to the S(X) and S(Y). In such an embodiment, the Hamming distance D may be computed using S(X) and S(Y) rather than computing the Hamming distance D using X and Y. Such a computed Hamming distance D with respect to S(X) and S(Y) may be used to draw an inference about the similarities within the two blocks (e.g., regarding the data content of the 2 blocks) without comparing the contents of the two blocks X and Y.

If (b1, b2 and b3) are three blocks of the same size; and D12 and D13 are the corresponding distances of each pair, where D12=D (b1,b2) is the distance between b1 and b2, and $D_{13}$=D(b1, b3) is the distance between b1 and b3, then a distance preserving hash function simhash, S, may be defined to determine hash values for all 3 blocks, b1, b2, and b3 where:

S1=S(b1) is the computed hash for b1 using the hash function S;
S2=S(b2) is the computed hash for b2 using the hash function S;
S3=S(b3) is the computed hash for b3 using the hash function S;

$d_{12}$=D(S1, S2) and $d_{13}$=D(S1, S3) (e.g., distances between hash values); and
if $d_{12}$<$d_{13}$ then $D_{12}$<$D_{13}$ Thus, the distance preserving hash function S, denoting simhash, has the property:
if $d_{12}$<$d_{13}$ then $D_{12}$<$D_{13}$ whereby simhash S preserves the distance relation between the data blocks (e.g., D(b1, b2)) and the hash values of such data blocks (e.g., D(S(b1), S(b2))). In other words, the relative distance between blocks are preserved when computing the distance using the calculated hash values using simhash, S, for such blocks.

The similarity hash function S described in following paragraphs may be used to efficiently compute S(P) for a pages or data block P. The techniques described herein provide for clustering together pages or data blocks expected to contain similar content based on the similarity measurements or hash values determined with S.

Additionally, in at least one embodiment, the techniques in following paragraphs provide for alignment awareness. Two pages or data blocks may be similar when one of the pages is shifted by a specified amount with respect to the other data block as denoted by the alignment boundary or requirement "s" described elsewhere herein (e.g., as used in EQUATION 2). For example, consider a value of s=512 bytes as used and described in more detail elsewhere herein. Two pages may have identical content but one of the pages may begin on a different boundary alignment than the other page. In some existing systems, the foregoing two pages that begin on different boundary alignments may not actually be considered as similar and may not be candidates for data reduction. In at least one embodiment, an implementation of the similarity hash function S may tolerate a misalignment, for example, that is a multiple of "s". For example, in at least one embodiment, two pages may be considered similar if one page begins on a 1024 byte boundary and the second page begins on a 512 byte boundary but not a 1024 byte boundary. The second page may be considered misaligned with respect to the first page in that it may not have a starting address on a 1024 byte boundary. The techniques described in following paragraphs provide for such a tolerance of misalignment and evaluate the similarity of the first and second pages as candidates for data reduction even when one of the pages is shifted or misaligned with respect to the other page by the specified alignment tolerance such as a multiple of "s", such as a multiple of s=512 bytes. In this case, for example where "s"=512 bytes, 2 pages that have identical content, but where the one page begins on a 1024 byte boundary and the other page begins on a 512 byte or 1536 byte boundary, have the same similarity hash value S. Pages having the same content but which are misaligned by some multiple of s=512 bytes would have the same similarity hash value S. In at least one embodiment in accordance with the techniques herein where "s"=512 bytes, two pages may have similar or matching content when considering page P1 from a relative offset from the start of page P1, such as byte 512 or byte 1024 of P1, in comparison to page P2 from its starting relative offset 0. Using the techniques herein with "s"=512 bytes provides for detecting the similar or matching content between P1 and P2 where the similar or matching content may be included in one of the pages beginning at an offset or shift of 512 bytes in comparison to the other page. In contrast to other match detection processing without using the techniques herein, 2 pages may be compared byte for byte where such bytes compared may be at the same relative offset within both pages. Such other match detection processing without using the techniques herein may fail to detect matching or similar content of the 2 pages if the matching or similar content of both pages does not occur at the same relative offset (e.g. alignment) within both pages. In contrast, techniques herein provide for detecting similar content within 2 pages even if the similar or matching content is shifted within one page relative to another page by an amount that is a multiple of "s".

A majority (maj) function or operation may be defined with respect to a sequence of "n" bits that outputs a single bit value or 0 or 1. The value of maj is false or 0 when n/2 or more of the n bits are 0 are false, and the value of maj is true or 1 otherwise. More formally, the maj operation on the sequence of n bits may be expressed as in EQUATION 1 below:

$$maj(b1, \ldots, bn) = \begin{cases} 0 & \text{if the number of 0s in } (b_1, \ldots, b_n) \geq \frac{n}{2} \\ 1 & \text{otherwise} \end{cases}$$

EQUATION 1

In EQUATION 1, b1 . . . bn denotes the sequence of "n" bits or binary input values and each of b1 through bn is either 0 or 1.

It should be noted that EQUATION 1 determines a majority value regarding the n bits. Additionally, in the case of an even number of bits where n is even and where the number of 1's equals the number of 0's in the sequence of n bits, EQUATION 1 breaks the tie in favor of 0's. In other words, in the case where then bits consists of the same number of 0×s and 1's, EQUATION 1 outputs a value of 0.

As noted elsewhere herein, the simhash function S for a data block or page P may be denoted as S(P). The binary representation of P may be used in connection with forming features for the page P. Each feature is formed from bits of P. The bits may correspond to bit values for different bit positions in the binary representation of the page P.

In accordance with the techniques herein, the following parameters may be specified:
  k, denoting the number of bytes in each feature; and
  s, denoting an alignment boundary requirement and alignment tolerance.

Thus, "s" denotes that each page is expected to have an address or location that is aligned on a boundary denoted by "s" bytes. Additionally, "s" also denotes an alignment tolerance in that two pages considered for evaluation herein may be misaligned by integer multiple of "s" bytes and evaluated for similarity using the techniques herein.

In at least one embodiment in accordance with the techniques herein, k may be 32 and s may be 512. Such values are selected and used in connection with examples herein for a page size of 4096 bytes for purposes of illustration. However, the techniques herein may be used generally with any suitable values selected for such parameters, variables, and sizes. More generally, although particular values may be used herein for purposes of illustration herein, it will be appreciated by those of ordinary skill in the art that any suitable value may be used in connection with the techniques herein.

Generally, in at least one embodiment, the simhash, similarity hash value or similarity measurement for P determined using the similarity hash function S may include forming features from the binary representation of the page P, determining a hash for each of the features using a hash function H, and taking the bitwise majority for each bit position of the feature hashes. When determining the hash for each of the features using H, inputs to the hash function H may include the bits of P forming the feature as well as a salt value based on an index denoting the feature. In at least one embodiment, each feature fj of P may have a unique index j denoting that particular feature with respect to all other features formed from bits of the page P. Additionally, in at least one embodiment, the salt value may be computed as "j mod s", where j is the unique feature index, s is the alignment boundary requirement and alignment tolerance described elsewhere herein, and "mod" denotes the mathematical modulus or modulo operation. The modulo operation finds the remainder after division of one number by another (called the modulus of the operation). Given two positive numbers, a and n, a modulo n (abbreviated as a mod n) is the remainder of the division of a by n, where a is the dividend and n is the divisor. The foregoing is described in more detail in following paragraphs.

As a first step in connection with determining S(P), the features are formed from the page P. Generally, the features may be formed from the page P in any suitable manner from the bits of the binary representation of P.

Figure 3:
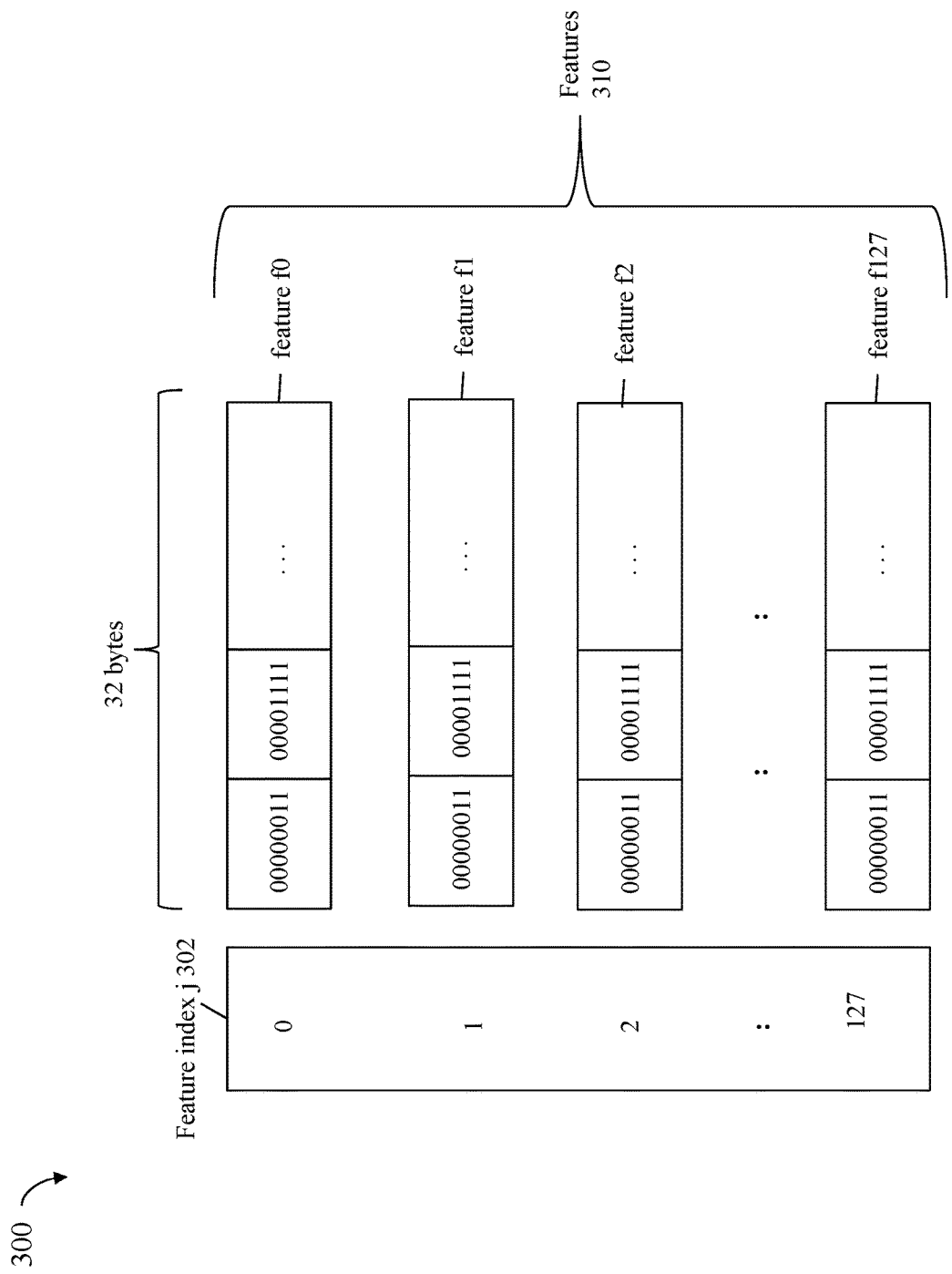
FIG. 3 is an example illustrating features formed for a page in an embodiment in accordance with the techniques herein.

Referring to FIG. 3, shown is an example illustrating features formed for a page P in an embodiment in accordance with the techniques herein. The example 300 illustrates 128 features formed for the page P that is 4096 bytes where each feature is 32 bytes. Element 302 denotes the unique feature index j 302 associated with each of the 128 features of page P.

In at least one embodiment as illustrated in FIG. 3, the binary representation of the page P may be viewed as a sequential stream of consecutive bits and bytes. Further each feature may be formed from a next sequence of k consecutive bytes of P. In such an embodiment, P may be partitioned into feature chunks where each chunk includes 32 consecutive bytes of the page P. For example, for the 128 features of 310, feature 0 may include the first 32 bytes, bytes 0-31, of P; feature 1 may include the next 32 bytes, bytes 32-63 of P; feature 3 may include the next 32 bytes, bytes 64-95, of P, and so on, for all 128 features of P. In this manner in such an embodiment, each byte located at a particular position or location within the page is only included once in one feature of the page P. For example, consider byte 1 of the page, where 1 denotes a particular position or index of the byte in the sequential stream of bytes of the page P. In such an embodiment, byte 1 may only be included in one of the features of P.

As a variation, an embodiment may form features of P using bytes from the page which do not form a single sequential consecutive stream of bytes of the page. For example, in at least one embodiment, a feature fj may be formed by extracting a first portion of bytes from the beginning of the page and a second portion of bytes from the end of the page.

In at least one embodiment, a function may be defined which determines the particular bytes are included in each feature.

In at least one embodiment, each page P may have the same number of features.

In at least one embodiment, each page P may not have the same number of features. In such an embodiment, one or more features of a page P may be ignored depending on the content or value of the features. For example, in at least one embodiment, a feature having a value of 0 where all bit positions of the feature are 0 may be skipped or ignored. Thus, in such an embodiment, there may be a varying number of features in one or more pages since rules may be specified which indicate when to skip or ignore a particular feature of a particular page. For example, a page P may have 128 features of which 2 of the features each contain all 0's for the bit values (e.g., each of the 2 features has an integer value of 0). In this case, the 2 features that are 0 may be omitted and processing as described elsewhere herein may proceed based on a total of 126 features rather than 128 features.

In at least one embodiment, each feature may be defined to be the XOR of the next two consecutive portions or sub-blocks of the page P. For example, feature 0 may be defined as the XOR of a first sub-block of k bytes and a second sub-block of k bytes; feature 1 may be defined as the XOR of a third sub-block of k bytes and a fourth sub-block of k bytes, and so on. Optionally, in at least one embodiment, the feature may be ignored if the resulting feature includes all zeroes denoting that the 2 XORed sub-blocks are the same and have the same content. In such a case where the feature is ignored, the feature may be further characterized in at least one embodiment as having a bit representation that denotes a zero integer value.

Subsequent forming the features in the first step, a second step may be performed. The second step may include determining for each feature a feature hash that is a hash value based on the content of the feature. In particular, the hash value for a feature fj may be based on the binary representation of the feature fj. The feature hash may be determined using the hash function denoted as H where H may be any suitable hash function that randomly generates a hash value for a given input. The hash values generated by H are thus randomly distributed and approximate an even or uniform distribution of hash values. Consistent with other discussion herein, with H, there is no correlation between the input and a hash value generated by H for the input. Thus, the Hamming distance D between 2 hash values generated using H for two corresponding inputs is uncorrelated with respect to the two corresponding inputs. For example, the Hamming Distance D between the 2 hash values is independent of the similarity or differences with respect to the 2 corresponding inputs. H may be, for example, a cryptographic hash function, may be hash function 512 as described in connection with FIG. 2A, and the like.

The second step may include determining a feature hash for feature fj based on inputs including the content or the binary representation of the feature fj and "j mod s". In the second step, H determines a hash value based on the feature and also the position or index j of the feature in the page. In this manner, two features having identical content but a different feature index have different hash values generated by H.

Consistent with discussion herein, the use of "mod s" may be used to force a desired alignment. Put another way, use of "mod s" takes into account the fact that 2 pages may be misaligned by an integer multiple of the alignment tolerance denoted by "s" bytes, such as 512 bytes. If 2 pages are misaligned by 512 bytes, use of "mod s" provides for evaluating whether the 2 pages as similar. For example, if the 2 pages have byte for byte matching content but 1 page is aligned or shifted by 512 bytes in comparison to the other page, the techniques described herein will determine that both pages are similar or match by having the simhash function S generate the same hash value for the 2 pages. Thus "s" may be characterized as denoting both an alignment requirement in that all pages must fall on an "s" byte boundary, and additionally, denoting an alignment tolerance.

In at least one embodiment, features may be larger than "s" bytes. In at least one embodiment, features may be smaller than "s" bytes.

In at least one embodiment, if the pages are all aligned on the same boundary granularity, then "mod s" may be omitted and the feature hash hj for feature fj may be determined as H(fj, j).

Consistent with other discussion herein, the techniques herein use a value denoted as a salt value provided as another input to the hash function H along with the feature fj when determining hj. In at least one embodiment, the salt value may be generally based on the feature index "j" associated with the feature also provided as input to the hash function H. In at least one embodiment, the salt value "j mod s" may be provided as input to H along with fj when computing hj for the feature fj.

An embodiment may generally combine or use the salt value "j mod s" with the feature fj in any suitable manner with H. In at least one embodiment, input to the hash function H when compute hj for the feature j includes the binary representations or integer values of the feature j, and "j mod s". The value of "j mod s" or salt value may be combined or used with the data of feature j in any manner. For example, an embodiment may determine a bit representation R for the integer value of "j mod s" and then concatenate, add, or perform some other operation between R and with the bit representation of the feature data fj.

In connection with the example described herein, assume that each hash value hj generated for feature fj by the hash function H is 64 bits and may be expressed as:

$$hj = H(fj, j \bmod s) \quad \text{EQUATION 2}$$

Figure 4:
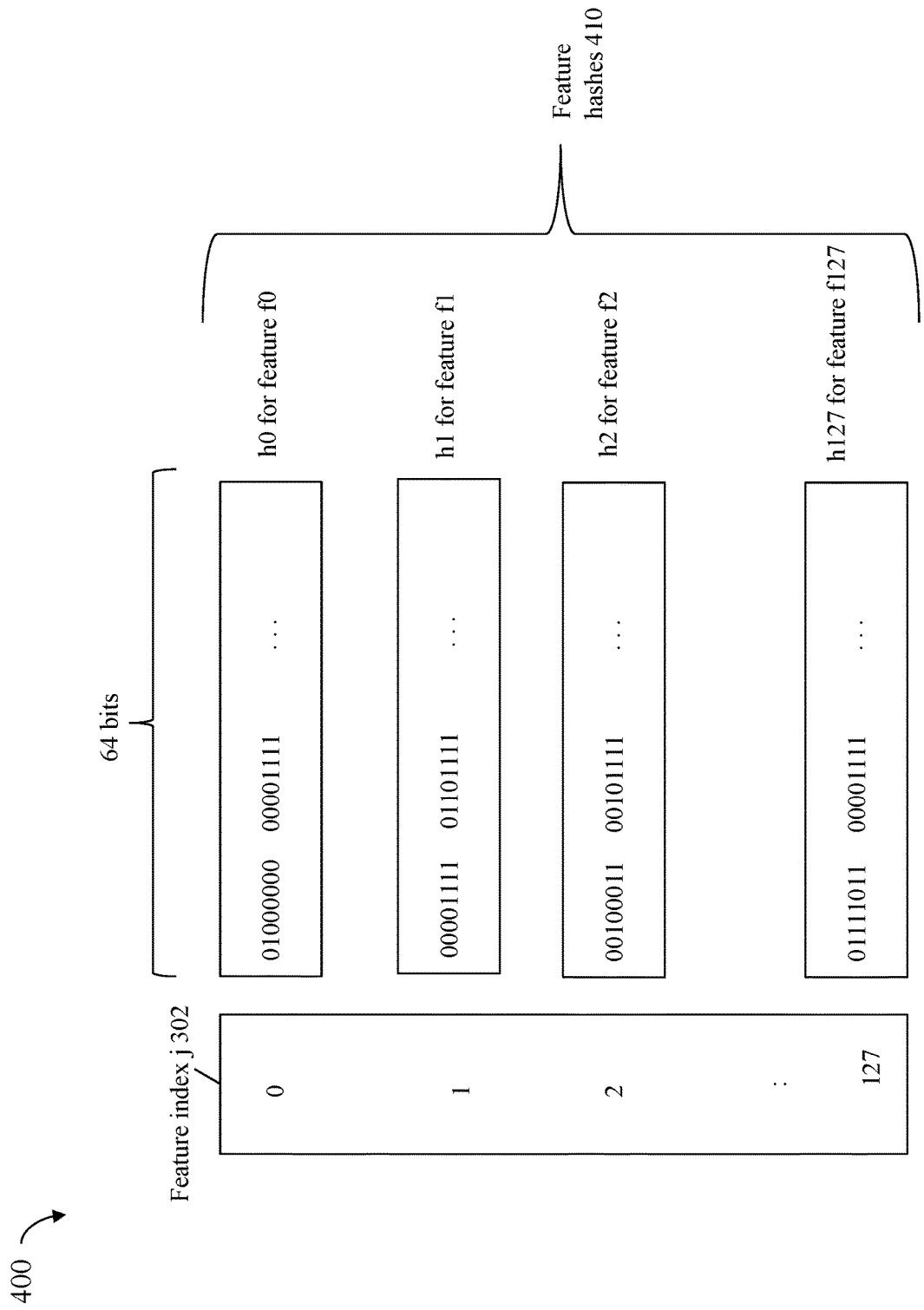
FIG. 4 is an example illustrating feature hashes formed for the features of the page in an embodiment in accordance with the techniques herein.

Referring to FIG. 4, shown is an example of the feature hashes generated using H after completion of the second step in at least one embodiment in accordance with the techniques herein. The example 400 includes feature index 302 denoting the different features f0 through f 127. Element 410 denotes the 128 feature hashes h0 through h127 computed, respectively, for features f0 through f 127 using H in the second step described herein. In this example 400, each of the feature hashes 410 may be 64 bits since, for example, the particular hashing function H may generate 64 bit hash values.

Subsequent to completing the second step in which the feature hashes are computed, a third step may be performed. In the third step, the bitwise majority (maj) is determined for each of the bit positions of the feature hashes. With reference to FIG. 4, 64 bitwise majorities are determined for the 64 bits of the feature hashes 410. For example, each feature fj has an associated hash value hj (e.g., hj=H(fj, j mod s)) that is 64 bits. In this case, the feature hashes each include 64 bits having corresponding bit positions 0 through 63, inclusively. In this case, a first bitwise majority is determined for with respect to all 128 feature hashes for hash bit position 0 based on the 128 bit values of hash bit position 0 of the 128 feature hashes 410; a second bitwise majority is determined for with respect to all 128 feature hashes for hash bit position 1 based on the 128 bit values of hash bit position 1 of the 128 feature hashes 410; and so on, for all 64 bit positions of the feature hashes. The bitwise majority, maj, for each of the bit positions 0 through 64 of the feature hashes may be computed as denoted by EQUATION 1.

To further illustrate with respect to the 128 feature hashes 410, assume that bit position 0 of 125 of the feature hashes 410 include 0 and that 3 of the feature hashes of 410 include 1. In this case, the bitwise majority for bit position 0 of the feature hashes 410 is 0. Further, assume that bit position 1 of 125 of the feature hashes 410 include 1 and that 3 of the feature hashes of 410 include 0. In this case, the bitwise majority for bit position 1 of the feature hashes 410 is 1. In a similar manner, the bitwise majority is determined for the remaining bit positions 2 through 63 of the feature hashes.

Thus, the output of the third step is a 64 bit value denoting S(P), the similarity hash or similarity measurement for the page P. More generally, S(P) has a value that is the size or number of bits of each of the feature hashes of 410. Each bit of S(P) having a corresponding bit position V is computed as the bitwise majority based on the bits of bit position V of the feature hashes 410.

In at least one embodiment as described herein where each page or data block is 4096 bytes and each feature is formed from sequential consecutive bits of the page P, S(P)i denoting the $i^{th}$ bit of the similarity hash value for page P computed as the bitwise majority of the $i^{th}$ bit of each of the feature hashes 410 may be expressed as:

$$S(P)_i = maj\left(\left(H((P)_{j*k...(((j+1)*k)-1)}, j\bmod s)_i\right)\Big|_{j=0}^{\lceil\frac{4096}{k}\rceil-1}\right) \quad \text{EQUATION 3}$$

where

S(P)i denotes the $i^{th}$ bit of the similarity hash value for page P computed as the majority of the $i^{th}$ bit of each of the computed feature hash values;

"k" denotes the number of bytes in each feature, such as 32 bytes;

H denotes the hash function used to compute a hash value for a feature "j" based on the content of data of feature "j" and its salt value "j mod s". The data content for feature "j" is located at bit positions j*k . . . (((j+1)*k)−1), where "j*k" denotes the starting bit position of the feature j in the page P and "(((j+1)*k)−1)" denotes the ending or last bit position of the features j in the page P (e.g., using 0 based bit positioning);

"j" denotes an index for the features of the page ranging from 0 through a maximum of (4096/k)−1, where 4096 denotes the number of bytes in each page. Thus, for k=32 bytes per feature, j ranges from 0 through 127, inclusively;

"s" denotes the byte alignment requirement and alignment tolerance for the page; and "maj" denotes the bitwise majority operation (e.g., as in EQUATION 1) on the sequence of bits of the "$i^{th}$" bit position in each of the feature hash values for all the j features.

In at least one embodiment, there may be an odd number of features for each page. If there are an even number of features for a page, in at least one embodiment processing may be performed to make the number of features odd, such as by removing one feature. In this manner, determining the bitwise majority such as described in connection with EQUATION 1 may operate on an odd number of features. In such an embodiment in which there are an odd number of features used for each page P, it is clear that the similarity hash function S maps a random page P to a uniformly distributed hash since the underlying feature hashes computed using H and the bitwise majority of uniformly distributed numbers is itself uniformly distributed.

In connection with the embodiment described herein for pages that are 4096 bytes, if two pages $P_1$, $P_2$ differ in one feature only, the probability of a bit being different between $S(P_1)$ and $S(P_2)$ is exactly the probability that the change flipped the bit in the corresponding hash and that there is exactly one more of that bit in the majority, bounded by the central binomial coefficient and therefore by $$\frac{1}{\sqrt{\frac{\pi}{2}\left\lceil\frac{4096}{k}\right\rceil}}.$$

If the pages are misaligned, adding the salt (e.g., j mod s, where j denotes the position or index of a feature and s is the alignment requirement and tolerance) ensures that the feature hashes of the different pages will only be similar if the pages are aligned on an "s" byte boundary. Features of different pages which are a multiple of 512 bytes apart may be considered or compared by computing the hashes of such features with the same "salt" as described herein. In at least one embodiment as described herein, features have a length of 32 bytes while respecting alignment of the page and features on a 512 byte boundary.

In at least one embodiment, if there are features which are known to be frequent or redundant in the data across pages, for example sequences of zeroes as described herein, they can be omitted from the bitwise majority calculations performed. This produces two desirable effects. First, it makes the computation shorter, and second, it increases the potential probability of a bit being different between similar pages if more of their features are of this kind. The latter is desirable, for example, because such features can be compressed very efficiently by themselves, so the potential data reduction obtainable from two similar pages is small if their similarity is supported only on such regions.

In at least one embodiment in accordance with the techniques herein, features do not have to be determined for all bits in the page. An embodiment may, for example, selectively sample or use only certain portions of each page in forming features of the page. Such selection may be based on a known general format or layout of the page, if known. For example, each page may include variable data interspersed with one or more metadata fields at particular known locations in each page. For example, a timestamp or other information may be included as a header in each page. The header may be located at the start of each page. The header may be a fixed size for each page or may vary in size with each page and the size may be encoded in a particular location of the header. The headers may be expected to include the same or similar data content. In such a case, processing may be performed to form features omitting the headers of the pages. If the format or layout of the pages is unknown, for example, for a data set including multiple pages, the pages of the data set may be analyzed or processed offline to determine, for example, which portions of the pages may be the same or similar across pages of the data set. The processing may then omit such redundant or similar portions of the data pages in connection with forming features as described herein.

What will now be described are flowcharts summarizing processing that may be performed in an embodiment in accordance with the techniques herein. The FIGS. 5, 6, 7, and 8 summarize processing as described above.

Figure 5:
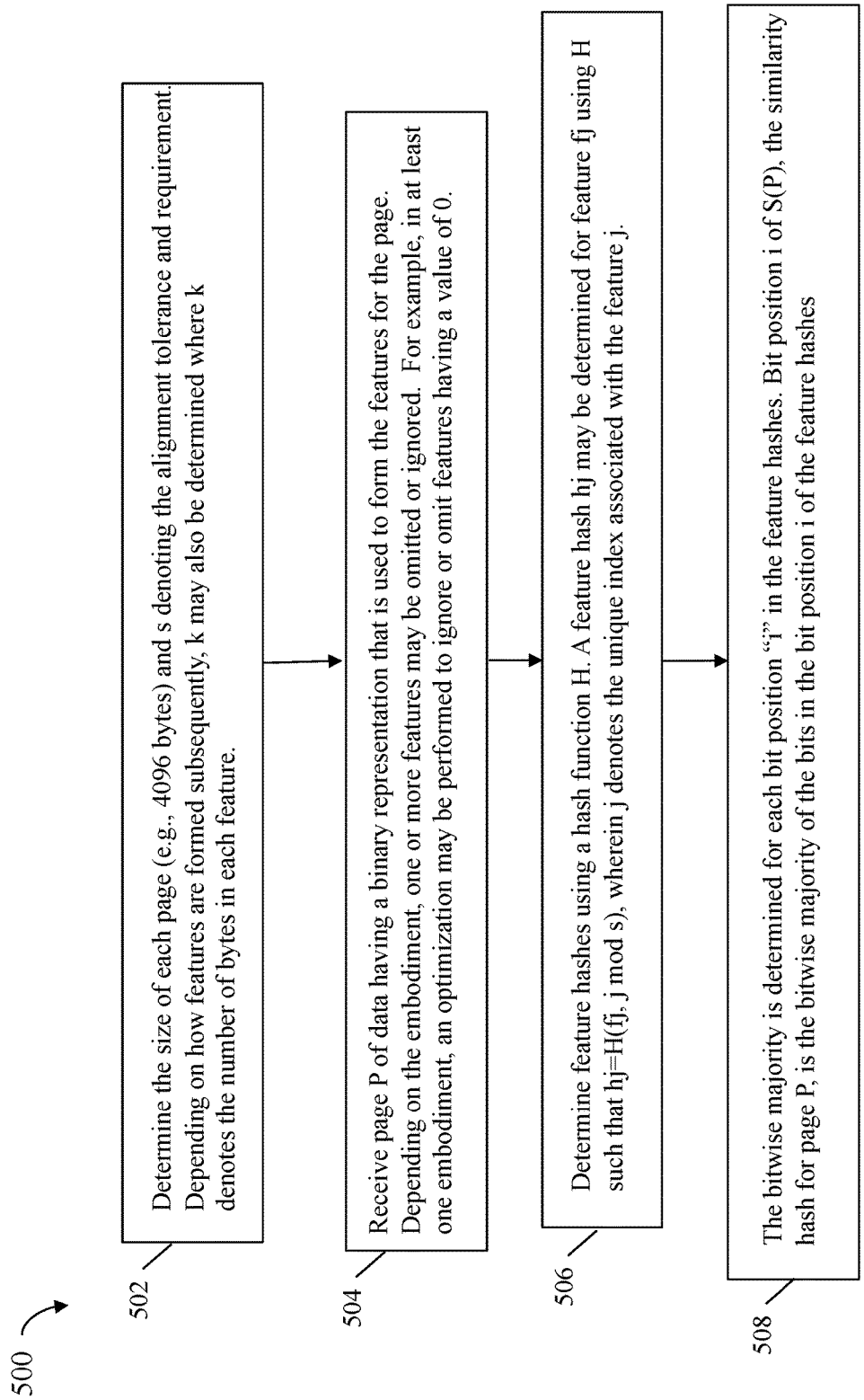
FIGS. 5, 6, 7, 8 and 9 are flowcharts of processing steps that may be performed in an embodiment in accordance with the techniques herein.

Referring to FIG. 5, shown is a first flowchart 500 of processing steps that may be performed in an embodiment in accordance with the techniques herein.

At the step 502, processing may be performed to determine the size of each page (e.g., 4096 bytes) and s denoting the alignment tolerance and requirement. Depending on how features are formed subsequently, k may also be determined where k denotes the number of bytes in each feature. From the step 502, control proceeds to the step 504.

At the step 504, a page P is received having a binary representation that is used to form features for the page P. Depending on the embodiment, one or more features may be omitted or ignored. For example, in at least one embodiment, an optimization may be performed to ignore or omit features having a value of 0. From the step 504, control proceeds to the step 506.

At the step 506, processing is performed to determine the feature hashes using a hash function H. A feature hash hj may be determined for feature fj using H such that hj=H(fj, j mod s), wherein j denotes the unique index associated with the feature j. From the step 506, control proceeds to the step 508.

At the step 508, processing may be performed to determine the bitwise majority for each bit position "i" in the feature hashes. Bit position i of S(P), the similarity hash for page P, is the bitwise majority of the bits in the bit position i of the feature hashes. Thus, at the completion of the step 508, S(P), the similarity hash for page P, has been determined.

The flowchart of FIG. 5 includes the steps 504, 506 and 508 performed for a single page P. More generally, such processing may be repeated to determine similarity hashes for other pages.

Figure 6:
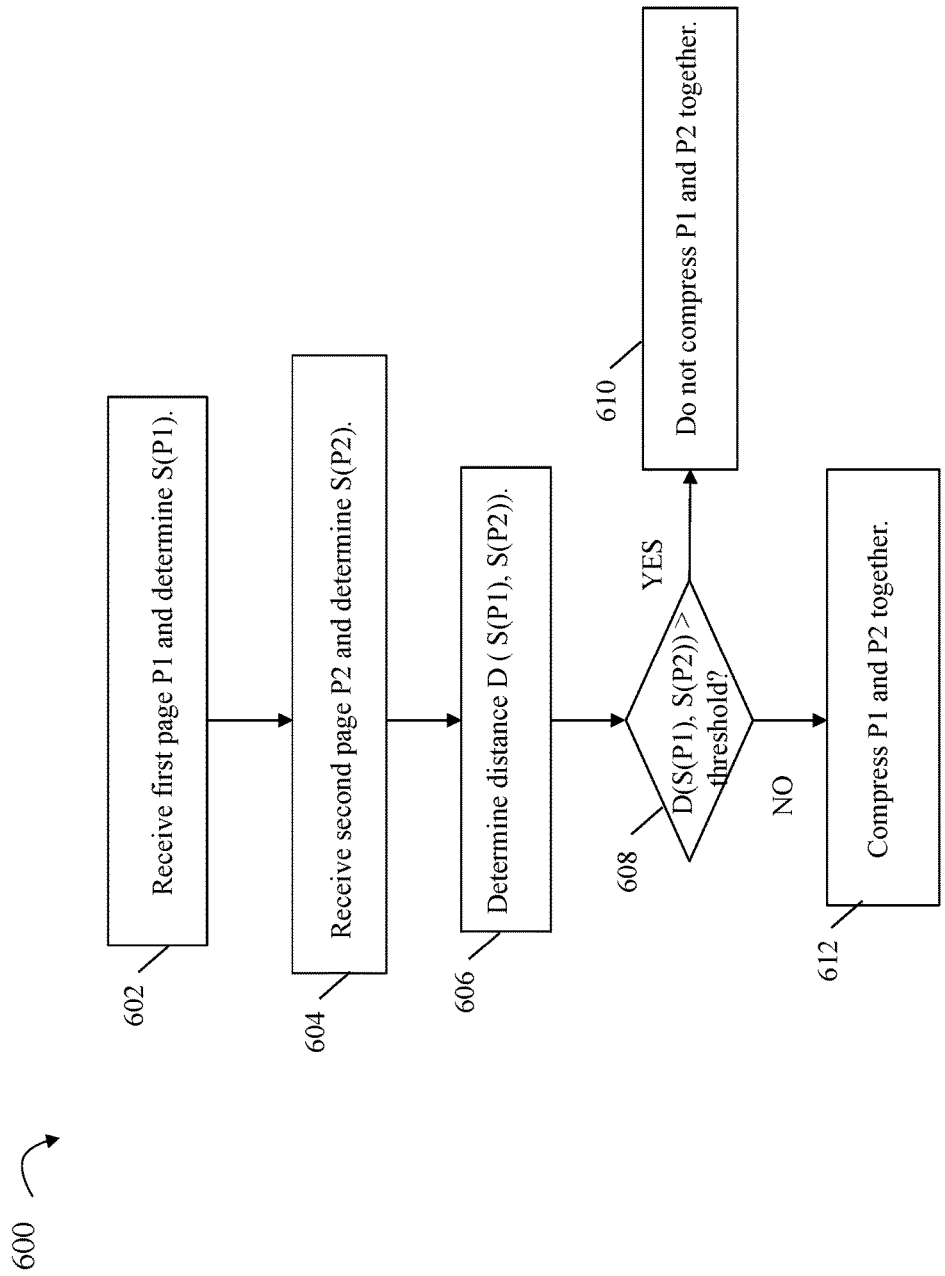

Referring to FIG. 6, shown is a second flowchart 600 of processing that may be performed in an embodiment in accordance with the techniques herein. The flowchart 600 may be performed to determine whether to compress 2 pages—P1 and P2—together.

At the step 602, page P1 may be received and S(P1), the similarity hash for P1, may be determined. From the step 602, control proceeds to the step 604.

At the step 604, page P2 may be received and S(P2), the similarity hash for P2, may be determined. From the step 604, control proceeds to the step 606.

At the step 606, the distance D(S(P1), S(P2)) may be determined, where the distance may be the Hamming distance as described herein. From the step 606, control proceeds to the step 608 where a determination is made as to whether D(S(P1), S(P2)) exceeds a specified threshold T1. If the step 608 evaluates to yes, control proceeds to the step 610 where processing determines not to compress P1 and P2 together since P1 and P2 are determined not to be similar based on the similarity threshold T1. If the step 608 evaluates to no, control proceeds to the step 612 where P1 and P1 are compressed together and included in the same single compressible unit. If the step 608 evaluates to no, it means that P1 and P2 are determined to be similar based on the similarity threshold T1.

The flowchart 600 is illustrated with respect to only 2 pages. However, more generally, the use of similarity hashes computed with the similarity hash function S processing as described herein may be performed with respect to any suitable number of pages, such as more than 2 pages.

Figure 7:
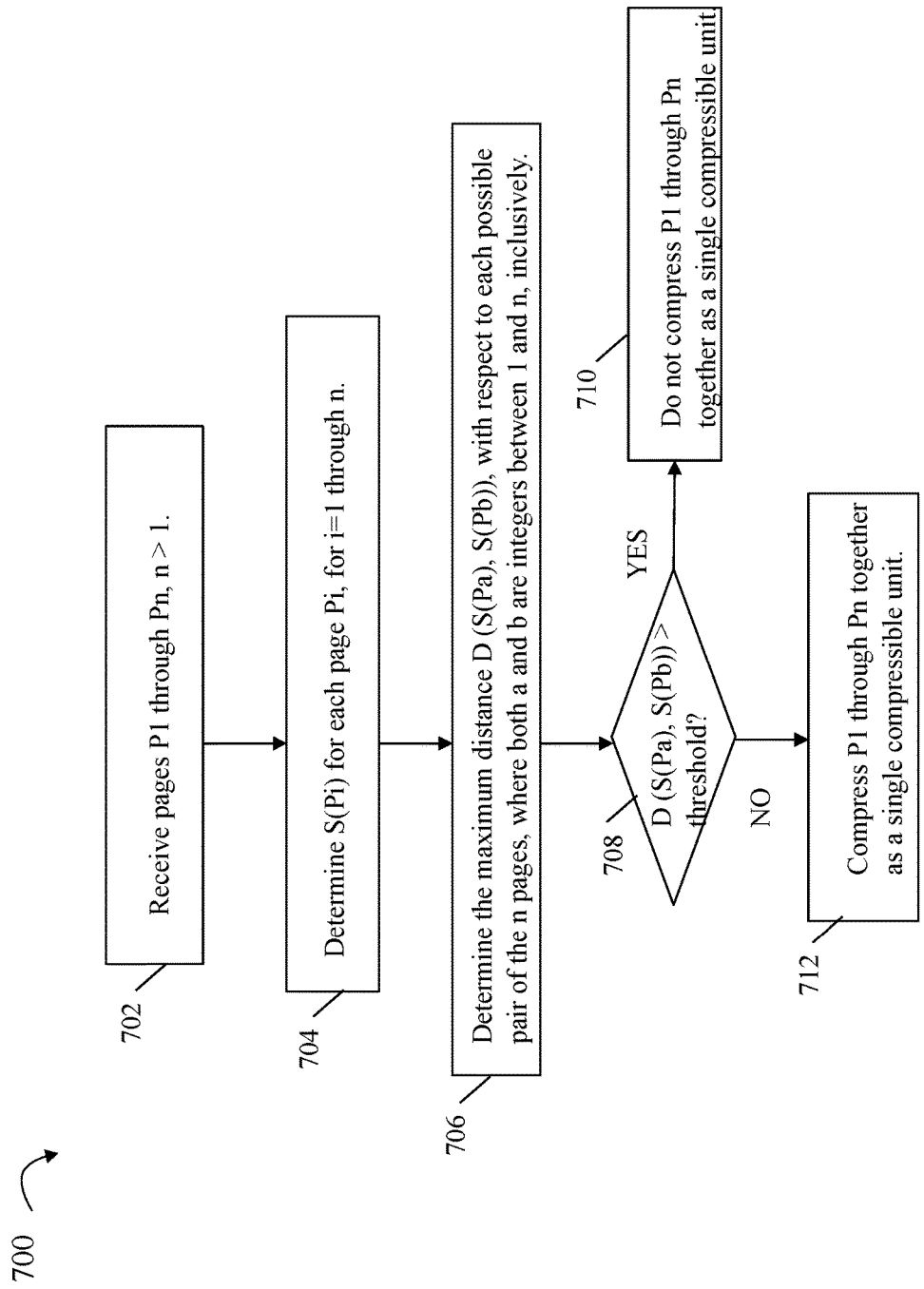

Referring to FIG. 7, shown is a second flowchart 700 of processing that may be performed in an embodiment in accordance with the techniques herein. The flowchart 700 may be performed to determine whether to compress a group of n pages together as a single compressible unit, where n may be larger than 1. Thus, the flowchart 700 generalizes the processing of FIG. 6 for any number of multiple pages n, where n is more than 1.

At the step 702, pages P1 through Pn are received, where n>1. From the step 702, control proceeds to the step 704. At the step 704, processing is performed to determine S(Pi) the similarity hash, for each page Pi, for i=1 through n. From the step 704, control proceeds to the step 706. At the step 706, processing determines the maximum distance D (S(Pa), S(Pb)), with respect to each pair of the n pages, where both a and b are integers between 1 and n, inclusively. The distance D may be the Hamming distance as described elsewhere herein. From the step 706, control proceeds to the step 708.

At the step 708, a determination is made as to whether D (S(Pa), S(Pb)) is greater than a specified threshold T denoting a similarity threshold. If the step 708 evaluates to yes, then control proceeds to the step 710 where it is determined that all the pages P1 through Pn are not similar to one another and all such n pages may not be compressed as a single compressible unit. If the step 708 evaluates to no, then control proceeds to the step 712 where it is determined all the pages P1 through Pn are similar to one another and may be compressed as a single compressible unit.

Generally, if the step 708 evaluates to yes as noted above, it may be that a portion or subset of less than all the n pages are sufficiently similar to one another to be compressed as a single compressible unit, where the maximum distance D (S(Pa), S(Pb)) with respect to each pair of pages Pa and Pb in the subset or portion does not exceed the specified threshold. In such a case where the maximum distance D (S(Pa), S(Pb)) with respect to each pair of pages Pa and Pb in the subset or portion does not exceed the specified threshold, the pages in the subset or portion may be compressed together as a single compressible unit.

Figure 8:
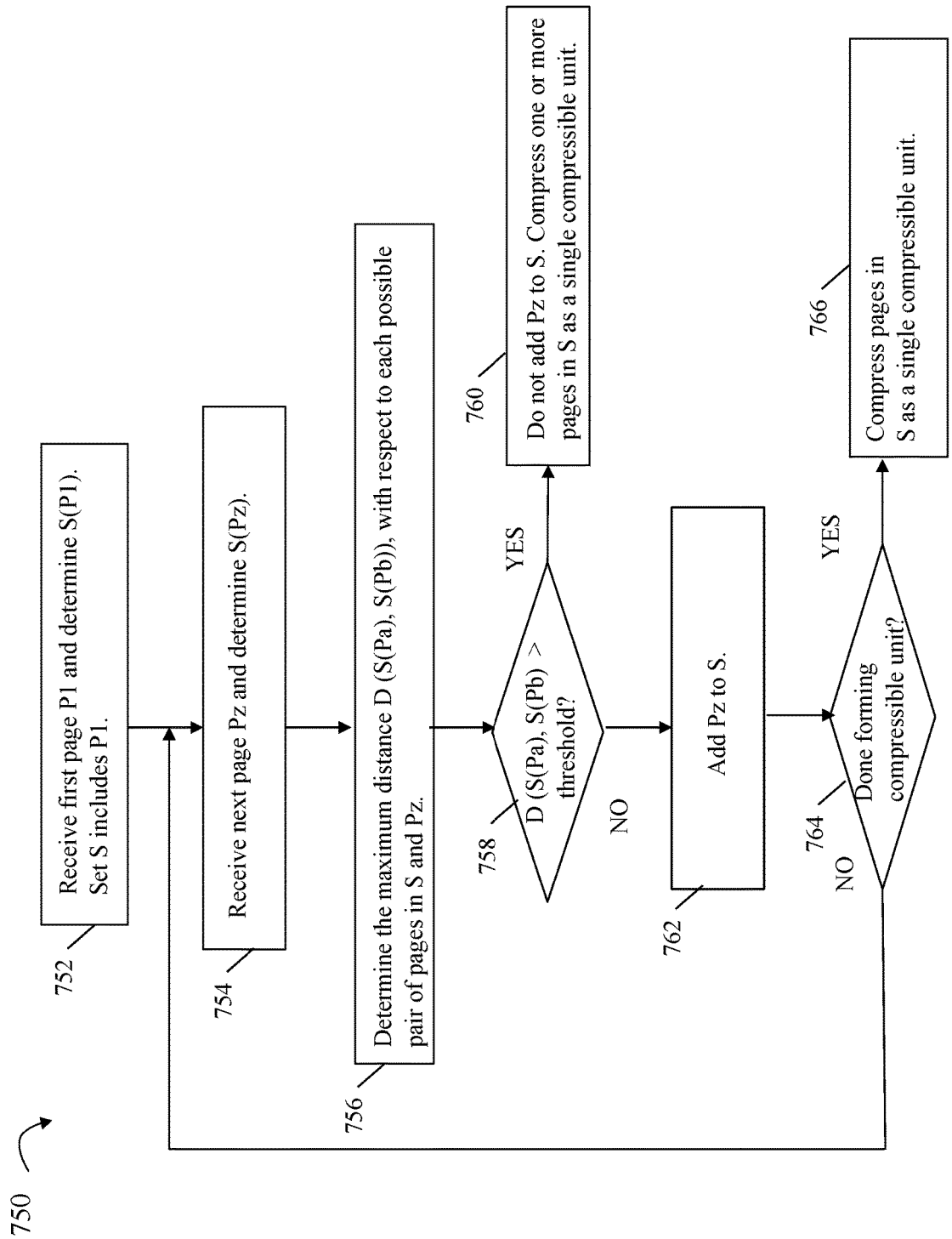

Referring to FIG. 8, shown is a third flowchart 750 of processing that may be performed in an embodiment in accordance with the techniques herein. The flowchart 750 may be performed to traverse a list of pages received and determine a subset S of the pages to be compressed as a single compressible unit, where n may be 1 or more. FIG. 8 processing may be characterized as processing a new page Pz that is added to a current set S if the new page Pz is determined to be similar to other one or more pages currently included in the set S. Thus, the set S may be incrementally determined and increased one new page at a time.

At the step 752, a first page P1 is received and the similarity hash S(P1) is determined. From the step 752, control proceeds to the step 754 where a next page Pi is received and the similarity hash S(Pz) is determined. From the step 754, control proceeds to the step 756.

At the step 756, processing determines the maximum distance D (S(Pa), S(Pb)), with respect to each possible pair of pages determined with respect to S and Pz. From the step 756, control proceeds to the step 758. At the step 758, a determination is made as to whether the maximum distance D (S(Pa), S(Pb)) exceeds a specified threshold. If the step 758 evaluates to yes, control proceeds to the step 760. At the step 760, processing determines not to add Pz to the set S and to compress the one or more pages in S as a single compressible unit. If the step 758 evaluates to no, control proceeds to the step 762 where Pz is added to the set S. From the step 762, control proceeds to the step 764.

At the step 764, a determination is made as to whether processing is done or complete for forming a compressible unit for those pages in the set S. The step 764 may terminate processing with respect to forming a compressible unit based on the pages currently in S based on any suitable condition or criteria. For example, an embodiment may specify a maximum number of pages that may be compressed as a single compressible unit. If the number of pages currently in S reaches this maximum, then step 764 may evaluates to yes. If the step 764 evaluates to yes, control proceeds to the step 766 to compress the pages currently in S as a single compressible unit. If the step 764 evaluates to no, control proceeds to the step 754 to continue with the next page.

Figure 9:
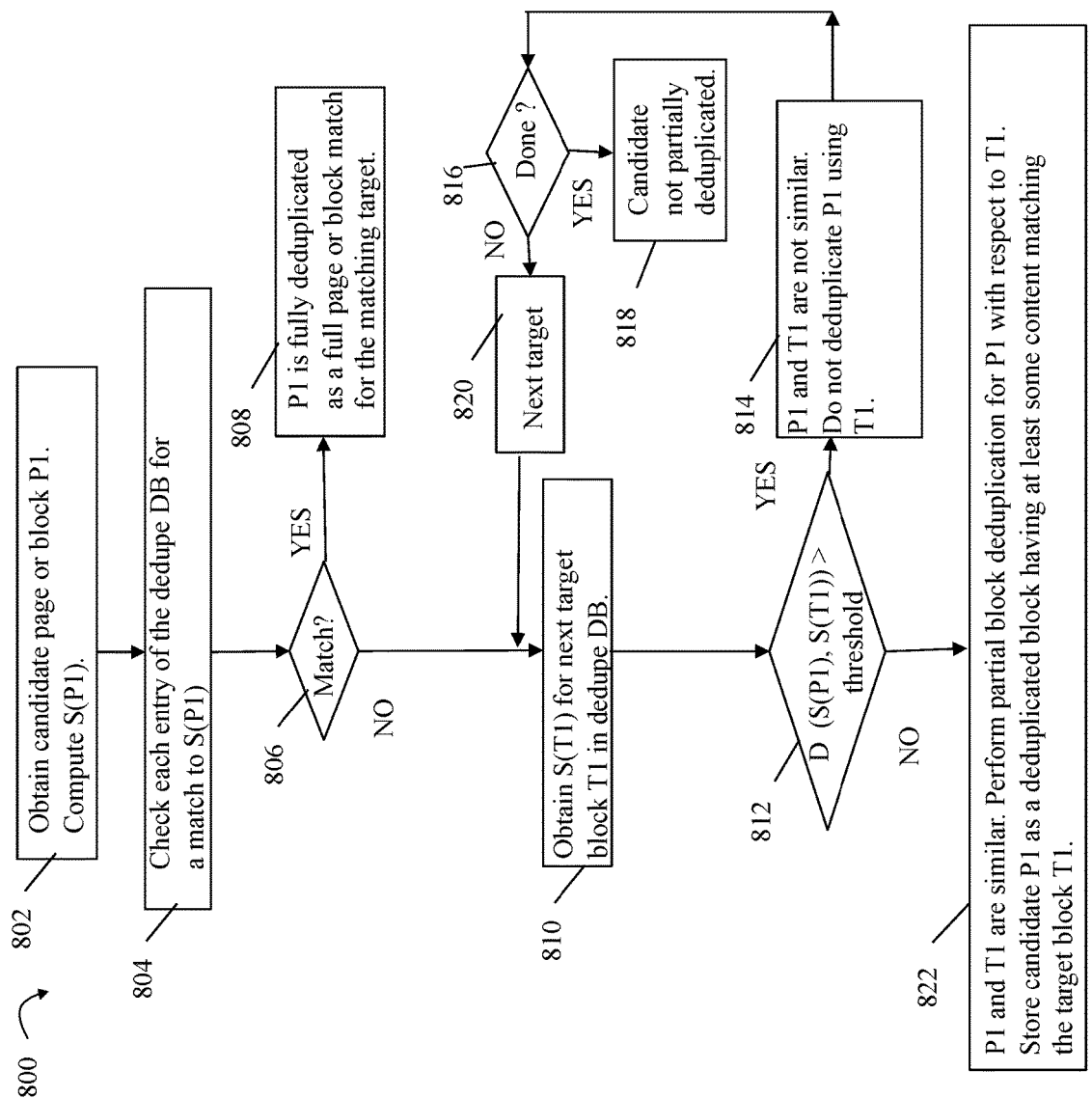

Referring to FIG. 9, shown is a fourth flowchart 800 of processing that may be performed in an embodiment in accordance with the techniques herein. The flowchart 800 may be performed in connection with data deduplication. At the step 802, a candidate page or block P1 may be obtained and the similarity hash S(P1) may be determined for the page P1. From the step 802, control proceeds to the step 804. At the step 804, each entry of the dedupe DB may be checked to determine a match to S(P1). The dedupe DB may include, for each target page or block T, its similarity hash S(T) which may be compared in the step 804 to S(P1). From the step 804, control proceeds to the step 806 to determine whether a matching entry in the dedupe DB was located where the matching entry is for a target block T having S(T)=S(P1). If the step 806 evaluates to yes, control proceeds to the step 808 where P1 is fully deduplicated as a full block match for the matching target block T.

If the step 806 evaluates to no, control proceeds to the step 810 where processing commences to determine whether the candidate page P1 may be partially deduplicated with respect to a target page in the dedupe DB. At the step 810, the similar hash S(T1) for a next target block T1 in the dedupe DB is obtained. At this point T1 may correspond to a first entry in the dedupe DB. From the step 810, control proceeds to the step 812. At the step 812, processing is performed that determined whether the distance D(SP(1), SP(T1) exceeds a specified threshold.

If the step 812 evaluates to yes, control proceeds to the step 814 where it is determined that P1 and T1 are not similar and P1 is not partially deduplicated with respect to T1. From the step 814, control proceeds to the step 816 where a determination is made as to whether processing for the candidate page P1 is complete. If the step 816 evaluates to yes, control proceeds to the step 818 where the candidate P1 is not partially deduplicated. If the step 816 evaluates to no, control proceeds to the step 820 where the next entry T1 from the dedupe DB is processed. From the step 820, control proceeds to the step 810.

If the step 812 evaluates to no, control proceeds to the step 822 where it is determined that P1 and T1 are similar. The step 822 may include performing partial or sub-block deduplication for P1 with respect to T1. The candidate P1 may be stored as a partially deduplicated page or block having at least some content that matches the current target T1. Consistent with discussion herein, for example, the information stored for the partially deduplicated block or page P1 may reference the current target T1 and may additionally store any unique content of P1 that is different from T1. When needed such as when servicing a read miss operation, P1 may be formed by obtaining the content of T1 and storing it in a cache, buffer or other memory location, and then overwriting cache, buffer or other memory location with the unique content of P1.

It should be generally noted that the terms digest, hash value, hash key, hash, and hash digest may be used interchangeably in various contexts herein to refer to an output generated by a hash function. In some contexts and in some embodiments, a hash value, hash or hash key may be directly output by a hash function, such as H, for a particular input, and a truncated form of the hash function output may be used as in connection with the techniques herein rather than a full hash value.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
receiving, using a processor, a page P having a binary representation;
determining, using a processor and the binary representation of the page P, a plurality of features for the page P, wherein each of the plurality of features for the page P is determined, at least in part, using a portion of bits of the binary representation of the page P;
determining, using a processor and a hash function, a plurality of feature hashes for the plurality of features, wherein each of the plurality of feature hashes corresponds to an associated one of the plurality of features, wherein said each feature hash is a corresponding hash value determined by the hash function based at least in part on inputs including a binary representation of said associated one of the plurality of features and an index associated with said different one of the plurality of features;
determining, using a processor and in accordance with the plurality of feature hashes for the plurality of features, a similarity hash for the page P, wherein each of the plurality of feature hashes includes N bits, wherein the similarity hash for the page P includes N bits, and wherein said determining the similarity hash for the page P includes:
determining a bitwise majority for each of the N bit positions in the similarity hash for the page P in accordance with bit values included in said each bit position in the plurality of feature hashes, wherein said bitwise majority for said each bit position in the similarity hash is 1 if a majority of bit values of said each bit position in the plurality of feature hashes is 1, and wherein otherwise said bitwise majority for said each bit position in the similarity hash is 0; and
forming the similarity hash for the page P where each of the N bit positions of the similarity hash is the bitwise majority determined for said each bit position of the similarity hash; and
performing, using a processor, data reduction processing using the similarity hash for the page P.

2. The method of claim 1, wherein the data reduction processing includes compression processing.

3. The method of claim 2, further comprising:
determining a second similarity hash for a second page P2;
determining a distance between the similarity hash for the page P and the second similarity hash for the page P2;
determining whether the distance exceeds a threshold;

responsive to determining that the distance exceeds the threshold, determining not to compress the page P and the page P2 together in a single compressible unit; and responsive to determining that the distance does not exceeds the threshold, determining to compress the page P and the page P2 together as a single compressible unit.

4. The method of claim 1, wherein the data reduction processing includes deduplication processing.

5. The method of claim 4, further comprising:
determining that the page P1 is not a full page match for an existing target page stored in a deduplication database;
determining a second similarity hash for a target page P2 stored in the deduplication database;
determining a distance between the similarity hash for the page P and the second similarity hash for the target page P2;
determining whether the distance exceeds a threshold; and
responsive to determining that the distance does not exceed the threshold, perform processing including:
determining that the page P1 is similar to the target page P2;
performing partial block deduplication for the page P1 with respect to the target page P2; and
storing the page P1 as a partially deduplicated page having at least some content matching the target page P2.

6. The method of claim 1, wherein said each feature hash is determined by the hash function further in accordance with a salt value including the index.

7. The method of claim 6, wherein the salt value is a remainder of the index divided by a first value.

8. The method of claim 7, wherein the first value denotes an alignment requirement for the page P.

9. The method of claim 7, wherein the first value denotes an alignment tolerance.

10. The method of claim 7, wherein the first value is an integer denoting a number of bytes.

11. The method of claim 1, wherein each of the plurality of features for the page P includes a same number of bits of the page P.

12. The method of claim 1 wherein each of the plurality of features for the page P is an output of a function that takes, as an input, a portion of bits of the page P.

13. The method of claim 1, wherein said determining the plurality of features for the page P includes:
partitioning the page P into a plurality of chunks, wherein each chunk includes a plurality of sequential consecutive bits from the page P, and wherein each of the plurality of chunks is one of the plurality of features.

14. The method of claim 1, wherein each of the plurality of features has a bit representation of an integer numeric value that is non-zero.

15. A system comprising:
at least one processor; and
at least one memory comprising code stored thereon that, when executed performs a method of processing data comprising:
receiving a page P having a binary representation;
determining, using the binary representation of the page P, a plurality of features for the page P, wherein each of the plurality of features for the page P is determined, at least in part, using a portion of bits of the binary representation of the page P;
determining, using a hash function, a plurality of feature hashes for the plurality of features, wherein each of the plurality of feature hashes corresponds to an associated one of the plurality of features, wherein said each feature hash is a corresponding hash value determined by the hash function based at least in part on inputs including a binary representation of said associated one of the plurality of features and an index associated with said different one of the plurality of features;
determining, in accordance with the plurality of feature hashes for the plurality of features, a similarity hash for the page P, wherein each of the plurality of feature hashes includes N bits, wherein the similarity hash for the page P includes N bits, and wherein said determining the similarity hash for the page P includes:
determining a bitwise majority for each of the N bit positions in the similarity hash for the page P in accordance with bit values included in said each bit position in the plurality of feature hashes, wherein said bitwise majority for said each bit position in the similarity hash is 1 if a majority of bit values of said each bit position in the plurality of feature hashes is 1, and wherein otherwise said bitwise majority for said each bit position in the similarity hash is 0; and
forming the similarity hash for the page P where each of the N bit positions of the similarity hash is the bitwise majority determined for said each bit position of the similarity hash; and
performing, using a processor, data reduction processing using the similarity hash for the page P.

16. A non-transitory computer readable medium comprising code stored thereon that, when executed, performs a method of processing data comprising:
receiving a page P having a binary representation;
determining, using the binary representation of the page P, a plurality of features for the page P, wherein each of the plurality of features for the page P is determined, at least in part, using a portion of bits of the binary representation of the page P;
determining, using a hash function, a plurality of feature hashes for the plurality of features, wherein each of the plurality of feature hashes corresponds to an associated one of the plurality of features, wherein said each feature hash is a corresponding hash value determined by the hash function based at least in part on inputs including a binary representation of said associated one of the plurality of features and an index associated with said different one of the plurality of features;
determining, in accordance with the plurality of feature hashes for the plurality of features, a similarity hash for the page P, wherein each of the plurality of feature hashes includes N bits, wherein the similarity hash for the page P includes N bits, and wherein said determining the similarity hash for the page P includes:
determining a bitwise majority for each of the N bit positions in the similarity hash for the page P in accordance with bit values included in said each bit position in the plurality of feature hashes, wherein said bitwise majority for said each bit position in the similarity hash is 1 if a majority of bit values of said each bit position in the plurality of feature hashes is 1, and wherein otherwise said bitwise majority for said each bit position in the similarity hash is 0; and
forming the similarity hash for the page P where each of the N bit positions of the similarity hash is the bitwise majority determined for said each bit position of the similarity hash; and performing data reduction processing using the similarity hash for the page P.

17. The non-transitory computer readable medium of claim 16, wherein the data reduction processing includes compression processing.

18. The non-transitory computer readable medium of claim 16, wherein the data reduction processing includes deduplication processing.

* * * * *